Sept. 29, 1953  W. S. SCHAEFER  2,654,014
METHOD OF INERT-ARC WELDING OF STAINLESS TUBING
Filed Feb. 19, 1948

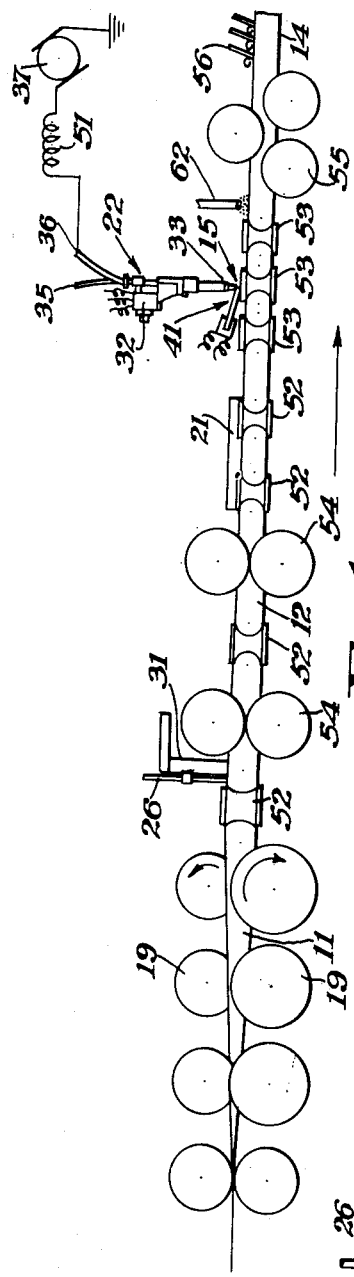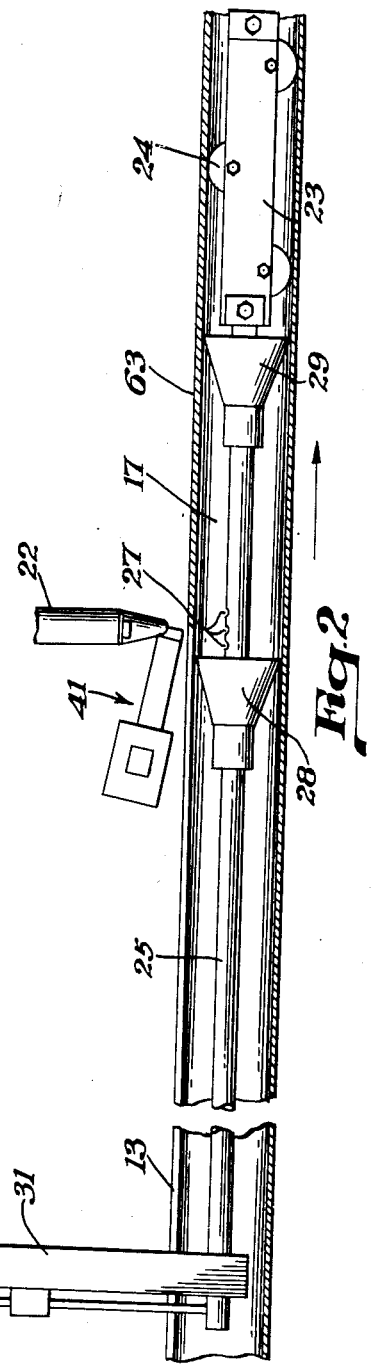

INVENTOR.
WALTER S. SCHAEFER.
BY Richey + Watts
ATTORNEYS.

Patented Sept. 29, 1953

2,654,014

UNITED STATES PATENT OFFICE 2,654,014

METHOD OF INERT-ARC WELDING OF STAINLESS TUBING

Walter S. Schaefer, Euclid, Ohio, assignor to Republic Steel Corporation, Cleveland, Ohio, a corporation of New Jersey Application February 19, 1948, Serial No. 9,575

2 Claims. (Cl. 219—6)

This invention relates to the continuous welding of longitudinal metallic seams such as in the formation of seamless tubing from blanks.

An object of the invention is to make a high quality weld at high speeds on such materials as stainless steel, for example. A more specific object is to maintain a low, smooth, bright inside weld bead.

It is an object to exclude air and prevent oxidation or corrosion. A further object is to surround the welding electrode and the abutting surfaces being welded economically with helium or other inert gas. Still another object of the invention is to promote safety of welding, eliminate flames and prevent explosions, injuries to operators, and damage to welds, such as may occur when employing a reducing atmosphere.

Another object of the invention is to improve control of arc, diminish the arc trail, and maintain the arc very nearly vertical in a position of maximum stability. In addition, it is an object to prevent erratic motion and contact with the work by automatically fed welding electrodes, as well as to permit maintenance of the welding rod tip at an ample distance from the work. An object is to prevent burning holes in the work and to avoid "skip" welds.

An additional object is to cause the electrode to burn away evenly and at a relatively slow rate only.

Still another object of the invention is to minimize work required of operators and to avoid any necessity for maintaining two separate gas supplies with their pipe lines, regulators, valves, etc.

It is also an object of the invention to produce high-quality welded steel tubing at a high rate of speed and to provide improved, reliable, economical welding apparatus.

Other and further objects, features and advantages of the invention will become apparent as the description proceeds.

In carrying out my invention, after the skelps have been bent to the form of tubular blanks with open seams, an inert gas, such as helium, is injected into the interior of the tubing blank and confined to a predetermined relatively short portion of the tubing. An electric arc is drawn from the edges of the seam at the portion of the tubing where inert gas is confined and the tube is moved longitudinally so that successive portions of the tube seam are heated by the arc and welded while the interior of the portion of the tube being welded is filled with the inert gas to obtain a bright bead on the inside of the tubing as the weld is made. Owing to the relative motion of the arc and the tubing, there would ordinarily be an arc trail with the arc making a relatively small acute angle with the tubing. In order to avoid this and make the arc perpendicular to the tubing, with but a slight trail, the arc is deflected. This is preferably accomplished by producing an electromagnetic field transverse to the arc and transverse to the direction of motion of the tubing. The field is given such polarity and strength as to deflect the arc nearly to the perpendicular position where the tubing is traveling horizontally. In this manner a maximum of arc stability and a minimum of tendency to wander are attained.

In performing the novel method, a conventional type of tube welding machine may be employed having rolls which convey the skelp and form it into blank tubes having open seams with conventional seam-closing or welding rolls and burr rollers and cutters, except that the welding rolls are insulated and composed of non-magnetic material. The welding head employed is provided with conventional automatic mechanism for feeding the welding rod and maintaining a predetermined arc length by regulating the position of the weld tip to keep the arc voltage constant. In addition, the welding head is provided with a nozzle surrounding the tip of the welding rod for supplying an inert gas, such as helium. Furthermore, in accordance with the invention a novel mandrel and mandrel supporting rod are provided. The mandrel rod is hollow and has an inlet for helium or other inert gas at the trailing end where the rod is supported by a bracket projecting through the open seam in the tube blank. Toward the other end of the mandrel rod there are outlet openings at the position lying under the welding head. On either side of the outlet openings sealing cups are provided which are composed of a resilient material, such as rubber or other similar material such as synthetic or plastic, adapted to seal or close the space within the tube blank under the welding head and conserve the inert gas flowing into the space through the outlet openings of the hollow mandrel rod.

In addition, an arc director is provided having pole faces on either side of the welding rod tip lying transverse to the direction of the seam to be welded and transverse to the direction of motion of the tube blanks so as to set up a magnetic field with lines of magnetic flux intersecting the arc and tending to divert it longitudinally.

A better understanding of the invention will be afforded by the following detailed description considered in conjunction with the accompanying drawings, in which:

Fig. 1 is a schematic diagram, as seen from the side, of a welding machine for forming tubing;

Fig. 2 is a fragmentary diagram of a portion of the apparatus of Fig. 1 as seen from the side and with the tubing broken away to expose the mandrel rod;

Like reference characters are utilized throughout the drawing to designate like parts.

Figure 3:
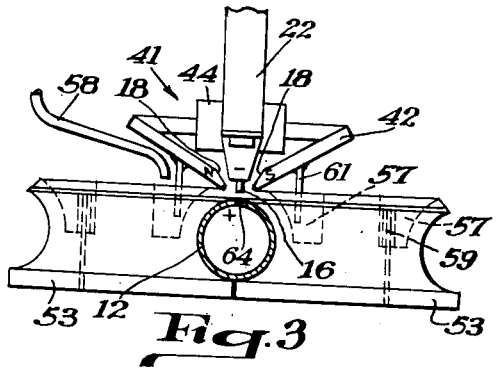
Fig. 3 is a fragmentary diagram showing the arc director and welding rolls in greater detail.

As illustrated schematically in the drawing, the tubing is formed by bending skelps 11 into the form of tube blanks 12 having an open seam cleft 13. The open seam cleft is welded shut to form seamless tubing 14. The welding is accomplished by means of an arc 15 drawn between an electrode 16 and the tube blank 12.

Figure 7:
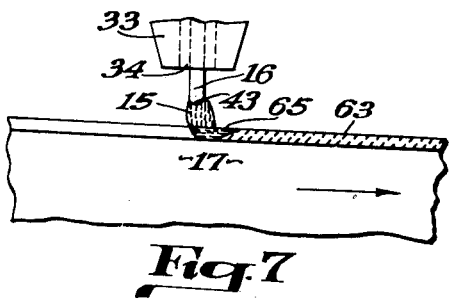

In order to preserve brightness of the inside welding bead, particularly in the welding of stainless steel, the space 17 directly under the arc 15 is filled with an inert gas, such as helium or argon, and for the sake of economy the gas is confined to a relatively short length of tubing adjacent the arc 15. Thus, the heat of the arc is maintained solely by the flow of electrical current and is not augmented by combustion of gases or metal surrounding the arc. In order to stabilize the arc 15 and to reduce the arc trail for improving the welding operation in other respects, the arc is deflected very nearly to a vertical position with a very slight arc trail, as illustrated in Fig. 7. This is done by directing magnetic flux through the arc in a direction transverse thereto and transverse to the direction of travel of the tube blank 12 by providing a pair of electromagnetic pole faces 18 on either side of the arc 15.

Although my invention is not limited to the use of any particular apparatus, the method thereof may be carried out in conjunction with the welding of tubing in automatic continuous welding machines similar to those already in use.

In the apparatus illustrated in the drawings, there are rolls 19 for forming the skelp 11 into the tube blanks 12 in the conventional manner. There is a seam guide 21 for maintaining the seam cleft 13 uppermost and there is a welding head 22 for producing the electric arc 15. A conventional mandrel 23 may be employed carrying inner burr rollers 24.

However, for supporting the mandrel 23 and injecting inert gas, such as helium, into the space within the tube blank 12 under the welding head 22, a hollow mandrel rod 25 is provided having an inlet pipe 26 at one end connected to a supply of inert gas such as helium, not shown, and having lateral openings 27 at the other end at the position under the welding head 22. For confining the inert gas inside the tube blank 12 to the space in the immediate proximity to where the weld is being made, sealing cups 28 and 29 are mounted on the mandrel rod 25. The sealing cups 28 and 29 are composed of resilient material, such as natural or synthetic rubber or plastic or the like, and are of sufficient size to engage the inner surface of the blank 12 and seal the space around the openings 27.

The mandrel rod 25 may be supported in a conventional manner as by means of a bracket 31 extending through the open seam cleft 13.

The welding head 22 or inert-arc torch includes a weld rod or electrode 16 of high melting metal such as tungsten, for example, and suitable conventional mechanism, represented by a rectangle 32, for feeding the weld rod 16 and for automatically maintaining a predetermined length of the arc 15. As will be understood by those skilled in the art, such conventional apparatus may be arranged for causing the weld rod to move up or down to lengthen or shorten the arc as the voltage of the arc departs from a predetermined value, such as eighteen volts, for example.

Figure 6:
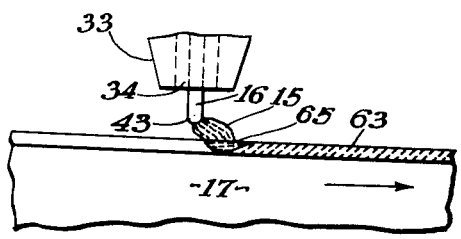
Figs. 6, 7 and 8 are fragmentary diagrams illustrating the principle of operation of the apparatus.
Figure 8:
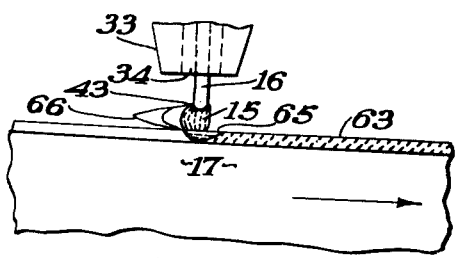

The welding head 22 also includes a nozzle 33 surrounding the weld rod or electrode 16 so as to leave an annular orifice 34, as shown in Figs. 6, 7 and 8, through which the helium may issue. The nozzle 33 is connected to a hose 35 connected to a source of helium or other inert gas, not shown. It will be understood that a suitable cable 36 is provided for connecting the weld rod 16 to a suitable source of welding current, such as a direct current generator 37, for example, having one terminal connected to the cable 36 and the other terminal grounded to the tube blank 12 or to suitable rollers supporting it. Preferably, the positive terminal of the generator 37 is grounded and the negative terminal is connected to the cable 36; but my invention is not limited thereto and the connections may be reversed or alternating current may also be employed.

Figure 4:
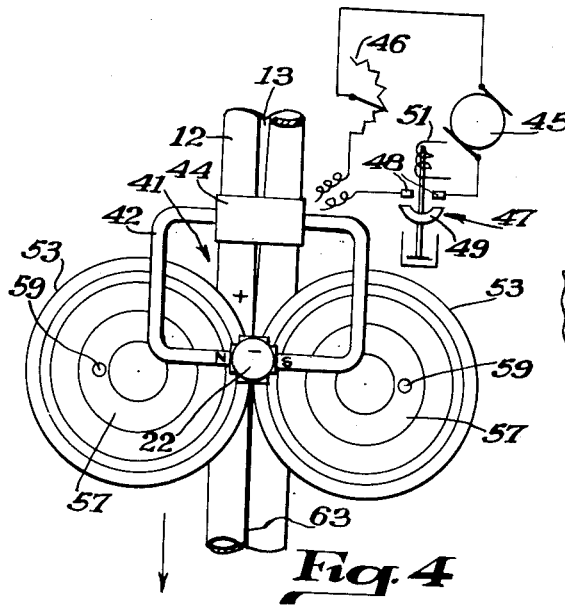
Fig. 4 is a plan view of the apparatus of Fig. 3.

For deflecting the electric arc to the position of slight arc trail an arc director 41 is provided. As illustrated in Figs. 3 and 4, such an arc director comprises a yoke member 42 composed of suitable, magnetizable, relatively permeable material, such as a soft iron, for example, having an air gap with pole faces 18 on either side of the tip 43 of the weld rod 16. The magnetic yoke 42 is provided with a winding 44 connected to a source of direct-current 45, preferably through a rheostat 46 for adjusting the magnetomotive force of the winding 44. A relay 47 may be provided for demagnetizing the arc director 41 until the arc 15 has been struck in order to prevent the arc from being blown off the seam when it is started. The relay 47 includes a pair of normally open stationary contacts 48, movable contacts 49 and a solenoid winding 51 for lifting the contacts 49 and closing a circuit to the magnetizing winding 44 whenever the relay operating winding 51 is energized. As illustrated in Fig. 1, the winding 51 may be connected in series with the arc welding generator 37 so as to hold the contacts 48 closed whenever the generator 37 is supplying an arc. Preferably the contacts 49 are of the slow-closing quick-opening type, well known to those skilled in the art, in order that ample opportunity will be given for striking the arc before the arc director comes into operation.

The apparatus shown in Fig. 1 may also include suitable conventional elements such as side-pressure and propelling rollers 52. The side pressure rollers in the immediate proximity of the welding head 22, however, namely welding rollers 53, are of unique construction in accordance with my invention. Conveying rollers 54 and burr rollers 55 may be provided, as well as burr cutters 56, all of which are conventional.

The side pressure and welding rollers 53 are preferably insulated from their supporting shafts or carried in insulating bearings and are composed of non-magnetic material in order to avoid interfering with the operation of the arc director 41. The welding rollers 53, also, in addition to being non-magnetic and insulated, are preferably provided with cooling-water cavities 57 adapted to be supplied with cooling water from a source, not shown, through a spout 58. An overflow pipe 59 may be provided.

The same means are preferably employed also for cooling the magnetic yoke 42 to prevent its temperature rising to such a high value that it will become non-magnetic. Cooling fins 61 may be secured to the yoke 42 and positioned in such a manner as to project into the cooling water trough 57 of the welding rollers 53. The arc director 41 is supported by means of a suitable bracket, not shown, which is attached to a stationary portion of the apparatus. My invention does not exclude alternative cooling arrangements such as air blasts directed against the cooling fins 61 or directly against the magnetic yoke 42. Having the pole faces 18 relatively close to the arc 15 facilitates control thereof, but my invention is not limited thereto. If a sufficiently powerful magnetizing coil 44 is employed, the air gap between the pole faces 18 may be increased sufficiently so that the yoke 42 will not be unduly heated by the arc, and in this case the cooling fins 61 may not be needed. A nozzle 62 may be provided for cooling the tubing by water spray after it has passed the welding head 22 and the weld has been completed.

When a skelp 11 is being formed into seamless tubing, it first passes through the forming rollers 19, then between the side-pressure rollers 52 and finally the welding rollers 53. The open seam cleft 13 is forced closed by the welding rollers 53 simultaneously with the heating of the edges of the seam by the arc 15. The heating of the arc melts the metal at the seam so as to form a weld 63, the outer bead of which is trimmed by the burr cutters 56 and the inner bead of which is rolled by the inner burr roller 24.

The flow of helium into the space 17 excludes air or corrosive atmosphere from the space within the blank 12 and results in the formation of a clean, low, smooth, bright inner bead 64. Likewise, the flow of helium through the nozzle orifice 34 surrounds the electrode 16 and the space around the outer surface of the blank 12 adjacent the arc 15 with inert gas to exclude air or corrosive atmosphere.

Without control of the arc by means of the arc director 41, the arc 15, as shown in Fig. 6, tends to trail behind the welded portion 63 of the tube 14 as it leaves the position of the welding head 22. There is a molten pool 65 under the end of the arc 15 which is relatively far away from the point directly under the weld rod 16. Most of the puddle 65 is outside the envelope of shielding gas which issues from the orifice 34 in the nozzle 33. Under these conditions the weld puddle becomes oxidized.

Since the weld control mechanism 32 is designed to maintain a constant arc length the weld tip 43 is brought perilously close to the tubing blank 12 in order to maintain the desired arc length. At times the edges of the open seam 13 may come closer to the weld tip 43 than the pool 65 and the arc 15 will skip to another point on the blank, leaving gaps in the weld seam which have not been closed. Furthermore, the feeding mechanism for the weld rod 16 will be subjected to violent changes in control impulses tending to cause the weld rod to be moved down so forcibly as to either burn a hole in the tubing or strike the tubing and cause the end of the weld rod 16 to be broken off. Furthermore, the tubing in the case of stainless steel tubing, for example, may be contaminated by direct contact with the weld rod, causing sputtering, giving a variable and gassy weld.

When the arc director 41 is energized, the arc is deflected as shown in Figs. 7 and 8, notwithstanding the speed of travel of the tube blanks. In magnetic devices heretofore known magnetic flux is produced in the direction of arc current flow. The magnetic field produced by the arc director described herein, however, is perpendicular both to the welding current flow and the direction of arc trail. The polarities of the pole faces are so chosen that the reaction between the current flowing in the arc 15 and the flux crossing between the pole faces 18 will exert a force on the arc in the direction opposite to the direction of motion to the tubing blank 12. For example, the weld electrode 16 is negative with respect to the work, as indicated in Fig. 3. The left-hand pole face will be given north polarity and the right-hand pole face will be given south polarity, as indicated in the drawing. If the polarity of the weld generator 37 is reversed, the polarity of the current source 45 supplying the magnetizing coil 44 will also be reversed.

The rheostat 46 may be so adjusted as to give sufficient magnetomotive force to make the arc 15 vertical, as shown in Fig. 8. However, the magnetomotive force is made slightly less so as to produce a substantially erect arc with a slight arc trail, as shown in Fig. 7. This adjustment has been found to give greater stability as it diminishes the tendency for the arc to wander longitudinally or transversely and also eliminates arc streamers 66, as shown in Fig. 8. If the arc has a slight trail, as shown in Fig. 7, the electrode tip 43 is still substantially the maximum distance from the tube blank 12 at which a predetermined arc length is obtained. Consequently, there is ample space between the arc tip 43 and the tube blank 12 to insure reliable, uniform operation of the arc and avoid any possibility of interference between the moving tubing and the electrode tip. The tungsten electrode burns away evenly and at only a very slow rate.

Although my invention has been described in connection with direct-current welding, it will be understood that it is not limited thereto and that when the source of welding current 37 takes the form of an alternating current generator or transformer, the energizing source 45 or the arc director winding 44 will also take the form of an alternating current source of the same frequency, the yoke 42 in this case preferably being laminated. By retaining the proper connections of the winding 44 to obtain the same relative polarity at any instant, as indicated in Fig. 3, of the arc current and the arc director, the same erecting action on the arc will be obtained, as discussed in connection with Figs. 6, 7 and 8.

Figure 5:
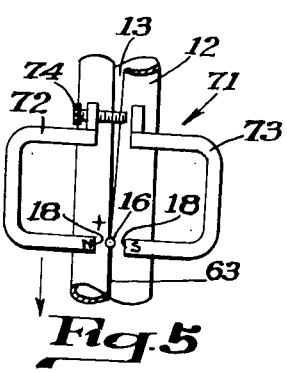
Fig. 5 is a partial view of alternative arc director employing permanent magnets instead of solenoids.

Alternatively the arc director may be rendered more compact by employing permanent magnets, as illustrated in Fig. 5. In this case an arc director 71 is provided, comprising a pair of magnetic yokes 72 and 73 having confronting pole faces 18, as in the arrangement of Figs. 3 and 4, but composed of a suitable permanent-magnet material having a high coercive force and high residual magnetization, such as an alloy of approximately 8% aluminum, 14% nickel, 24% cobalt, 3% copper and the remainder iron, such as described in the March 1944 issue of "Electrical Engineering" on pages 100–104. The flux intensity between the pole faces 18 may be adjusted by any suitable adjusting means, such as a magnetic screw 74 threaded at one end of the yoke member 72 and longitudinally movable with respect to the confronting end of the other yoke member 73.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claims.

What I claim is:

1. A method of welding a longitudinal seam in metallic tube blanks which comprises the steps of injecting inert gas into the interior of the tube blank at a certain portion thereof, confining the inert gas in said portion of the blank, striking an arc against the seam at said portion of the blank, maintaining the heat of the arc solely by flow of electrical current, causing relative motion between the arc and the blank, whereby the inert gas is injected in successive different portions of the blank, passing a magnetic field through the arc transversely to the arc and to the said direction of motion, of such polarity in relation to the polarity of the arc current as to apply a force to the arc in a direction opposite to the relative direction of motion of the blank and of insufficient strength to hold the arc vertical but sufficient to hold the arc substantially erect with a slight arc trail, and thereby electromagnetically deflecting the arc in a direction opposite to the relative direction of motion of the blank, whereby the angle of arc trail is diminished and the seam is welded by a stabilized arc as the blank progresses relative to the arc notwithstanding the inert condition surrounding the arc, the arc being strained electromagnetically to prevent it from wandering.

2. A method of welding the longitudinal seam in a metallic tube blank which comprises the steps of injecting helium into the interior of the tube blank at a certain portion thereof, confining the helium in said portion of the blank, striking an arc against the seam at said portion of the blank, maintaining the heat of the arc solely by flow of electrical current, surrounding the arc with helium, causing longitudinal travel of the blank whereby the helium is injected in successively different portions of the blank and the seam is welded by the arc as the blank progresses, passing a magnetic field through the arc transversely to the arc and to the said direction of travel of such polarity in relation to the polarity of the arc current as to apply a force to the arc in a direction opposite to the relative direction of travel and of insufficient strength to hold the arc vertical but sufficient to hold the arc substantially erect with a slight arc trail, and thereby electromagnetically deflecting the arc in a direction opposite to the relative direction of travel of the blank, whereby the angle of arc trail is diminished and the seam is welded by a stabilized arc as the blank progresses relative to the arc notwithstanding the inert condition surrounding the arc, the arc being strained electromagnetically to prevent it from wandering.

WALTER S. SCHAEFER.

References Cited in the file of this patent

UNITED STATES PATENTS

| Number | Name | Date |
|---|---|---|
| 388,245 | Bernardos | Aug. 21, 1888 |
| 396,270 | Coffin | Jan. 15, 1889 |
| 510,777 | Coffin | Dec. 12, 1893 |
| 1,580,020 | Cutler et al. | Apr. 6, 1926 |
| 1,746,081 | Hobart | Feb. 4, 1930 |
| 1,792,243 | Richter | Feb. 10, 1931 |
| 1,796,969 | Strobel | Mar. 17, 1931 |
| 1,854,536 | Wilson | Apr. 19, 1932 |
| 2,053,417 | Brace | Sept. 8, 1936 |
| 2,405,542 | Wassell | Aug. 6, 1946 |
| 2,422,305 | Kopec | June 17, 1947 |
| 2,433,296 | Schaefer | Dec. 23, 1947 |